A. SEARLS.
Pole Coupling for Vehicles.
No. 72,090. Patented Dec. 10, 1867.
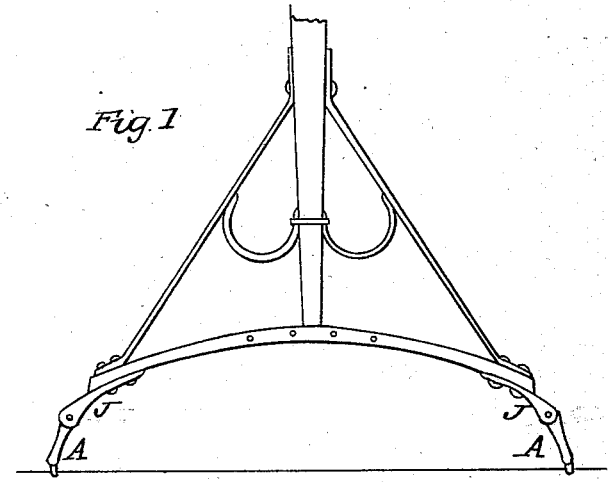
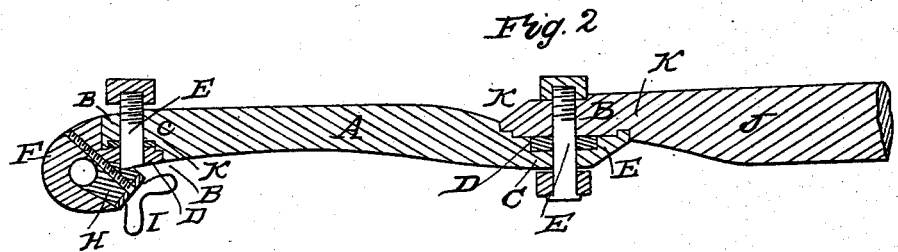
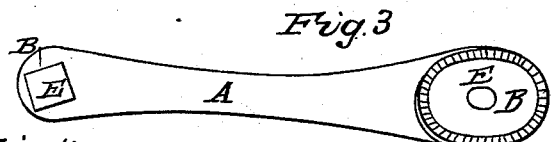
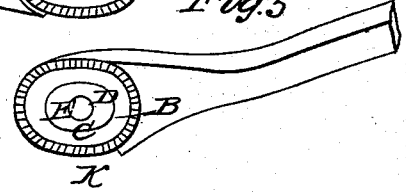
WITNESSES
INVENTOR

United States Patent Office.

ANSON SEARLS, OF NEW YORK, N. Y.

Letters Patent No. 72,090, dated December 10, 1867.

---

IMPROVED POLE-COUPLINGS FOR VEHICLES.

---

*The Schedule referred to in these Letters Patent and making part of the same.*

---

TO ALL TO WHOM THESE PRESENTS MAY COME:

Be it known that I, ANSON SEARLS, late of the city and county of San Francisco, State of California, but now of the city of New York, have made a new and useful Improvement in Pole-Couplings for Vehicles, which I call a Safety Adjustable Pole-Coupling, of which the following, taken together with the accompanying drawings, is a full, clear, and exact description.

The nature of my improvement consists in making the pole-iron, attaching a carriage-pole to the axle-clip, in such a manner, and so arranged and combined, with bolts and springs, as to be readily adjusted to any desired width, and be free from any liability to rattle or become loose, and be secure against accidents. In describing this improvement reference is made to the accompanying drawings, of which—

Figure 1 represents a portion of an ordinary carriage-pole, with the parts marked A and J referred to.

Figure 2 is a sectional view of the pole-iron.

Figure 3 is a view of the top of the arm A.

Figure 4 is a view of the hook F, or equivalent, attaching to the axle-clip, which may be adjusted to any desired position, by the use of the arm A and the joints B B at each end of the arm.

Figure 5 is a bottom view of the part J attaching to the pole.

The joints B B are held together by the bolts E E passing through them, and may be made with a head or nut on either end, or without a nut, and the thread of the bolt working in either upper or lower section of the joint, or may be riveted to secure them from becoming accidentally detached, all so as to best secure the joints together and admit of being readily adjusted. The joints B B are formed with a journal fitting into a corresponding recess, and on the flange around the journal, at the periphery, are ratchet-teeth, K K, that held them solid when adjusted. In the recess C of the joints is a rubber or equivalent spring, D D, to maintain a constant pressure on the bolt E to prevent its unscrewing. This spring may be placed under the head or nut of the bolt, giving a corresponding effect. In the aperture of the hook F is a rubber or equivalent spring, covered with a metallic cap, L, and held in place by the screw or bolt I. The hook F, or termination of this pole-iron, may be made in the form of a common eye or any other device that will attach to and correspond to the axle-clip, without interfering with the object sought by the afore-described arrangements.

Having thus described my invention, and in accordance therewith, I claim—

The circular joints B B, and the arrangements of the ratchet-teeth K K, springs D D, and bolts E E, in combination with the arm A, substantially as described and for the purposes set forth.

New York City, November 11, 1867.

ANSON SEARLS.

Witnesses:
C. S. VAN HORN,
JOHN A. GIFFORD.